US009504623B2

(12) United States Patent
Angold et al.

(10) Patent No.: US 9,504,623 B2
(45) Date of Patent: Nov. 29, 2016

(54) EXOSKELETON LOAD HANDLING SYSTEM AND METHOD OF USE

(75) Inventors: Russdon Angold, American Canyon, CA (US); Adam Zoss, Berkeley, CA (US); Homayoon Kazerooni, Berkeley, CA (US); Jon Burns, Oakland, CA (US); Kurt Amundson, Berkeley, CA (US); Nathan Harding, Oakland, CA (US)

(73) Assignee: Ekso Bionics, Inc., Richmond, CA (US)

( * ) Notice: Subject to any disclaimer, the term of this patent is extended or adjusted under 35 U.S.C. 154(b) by 969 days.

(21) Appl. No.: 13/639,984

(22) PCT Filed: Apr. 8, 2011
(Under 37 CFR 1.47)

(86) PCT No.: PCT/US2011/031815
§ 371 (c)(1),
(2), (4) Date: Jun. 4, 2013

(87) PCT Pub. No.: WO2011/127421
PCT Pub. Date: Oct. 13, 2011

(65) Prior Publication Data
US 2013/0303950 A1 Nov. 14, 2013

Related U.S. Application Data

(60) Provisional application No. 61/322,645, filed on Apr. 9, 2010.

(51) Int. Cl.
*A61H 3/00* (2006.01)
*B25J 9/00* (2006.01)
*B66D 3/18* (2006.01)

(52) U.S. Cl.
CPC .............. *A61H 3/00* (2013.01); *B25J 9/0006* (2013.01); *A61H 3/008* (2013.01);
(Continued)

(58) Field of Classification Search
CPC ........ A61H 3/00; A61H 3/008; A61H 1/024; A61H 2201/5061; A61H 2201/1614; A61H 2201/1238; A61H 2201/1616; A61H 2201/1621; A61H 2201/1623; A61H 2201/1628; A61H 2201/163; A61H 2201/1635; A61H 2201/1642; A61H 2201/165; A61H 2201/1676; A61H 2003/002; A61H 2203/0406; A61H 2201/1207; A61H 2201/5023; A61F 5/0102; B25J 9/0006; B66D 3/18
USPC .................................. 601/5, 23, 33, 34, 35
See application file for complete search history.

(56) References Cited

U.S. PATENT DOCUMENTS 3,357,613 A 12/1967 Chase
3,964,182 A 6/1976 Pomeret et al.
(Continued)

FOREIGN PATENT DOCUMENTS

WO WO 2010/101595 9/2010

OTHER PUBLICATIONS

Berkeley Bionics HULC exoskeleton system. Datasheet [online]. Berkeley Bionics, Jul. 2008 [retrieved on Jul. 21, 2010]. Retrieved from the Interent: <URL: http://web.archive.org/web/20080731221227/http://berkeleybionics.com/Unrestricted/HULC.html>. Entire Document.

*Primary Examiner* — Quang D Thanh
(74) *Attorney, Agent, or Firm* — Diederiks & Whitelaw, PLC

(57) ABSTRACT

An exoskeleton, configurable to be coupled to a person, includes an exoskeleton trunk connected to first and second leg supports at respective hip joints, which allow for flexion and extension about respective hip axes. A counterweight device including an auxiliary mass is connected to the exoskeleton trunk through an actuator such that the auxiliary mass extends in a position behind the exoskeleton trunk. A front load is supported by the exoskeleton through a load bearing device including a load shifting device for selectively operating powered reel mechanisms to raise or lower the front load with respect to the exoskeleton trunk. The auxiliary mass can be selectively shifted with respect to the exoskeleton trunk to balance the moment created about the hip axes by the auxiliary mass and the moment created by a downward force of the load on the load bearing device.

34 Claims, 1 Drawing Sheet

(52) U.S. Cl.
CPC ............. *A61H 2003/002* (2013.01); *A61H 2201/1207* (2013.01); *A61H 2201/5023* (2013.01); *A61H 2203/0406* (2013.01); *B66D 3/18* (2013.01)

(56) References Cited

U.S. PATENT DOCUMENTS

| | | | |
|---|---|---|---|
| 4,058,025 A | 11/1977 | Wood | |
| 6,666,796 B1 * | 12/2003 | MacCready, Jr. | A61F 5/0102 135/65 |
| 6,764,231 B1 | 7/2004 | Shubert | |
| 6,886,812 B2 | 5/2005 | Kazerooni | |
| 7,947,004 B2 | 5/2011 | Kazerooni et al. | |
| 7,963,932 B2 | 6/2011 | Ashihara et al. | |
| 8,057,410 B2 | 11/2011 | Angold et al. | |
| 8,353,434 B2 | 1/2013 | Clayton, III et al. | |
| 8,849,457 B2 | 9/2014 | Jacobsen et al. | |
| 2002/0100899 A1 | 8/2002 | Kazerooni | |
| 2005/0279796 A1 * | 12/2005 | Chu | A45F 3/08 224/637 |
| 2006/0247904 A1 | 11/2006 | Dariush | |
| 2007/0056592 A1 | 3/2007 | Angold et al. | |
| 2007/0123997 A1 | 5/2007 | Herr et al. | |
| 2009/0292369 A1 | 11/2009 | Kazerooni et al. | |
| 2010/0262275 A1 | 10/2010 | Schoening et al. | |

* cited by examiner

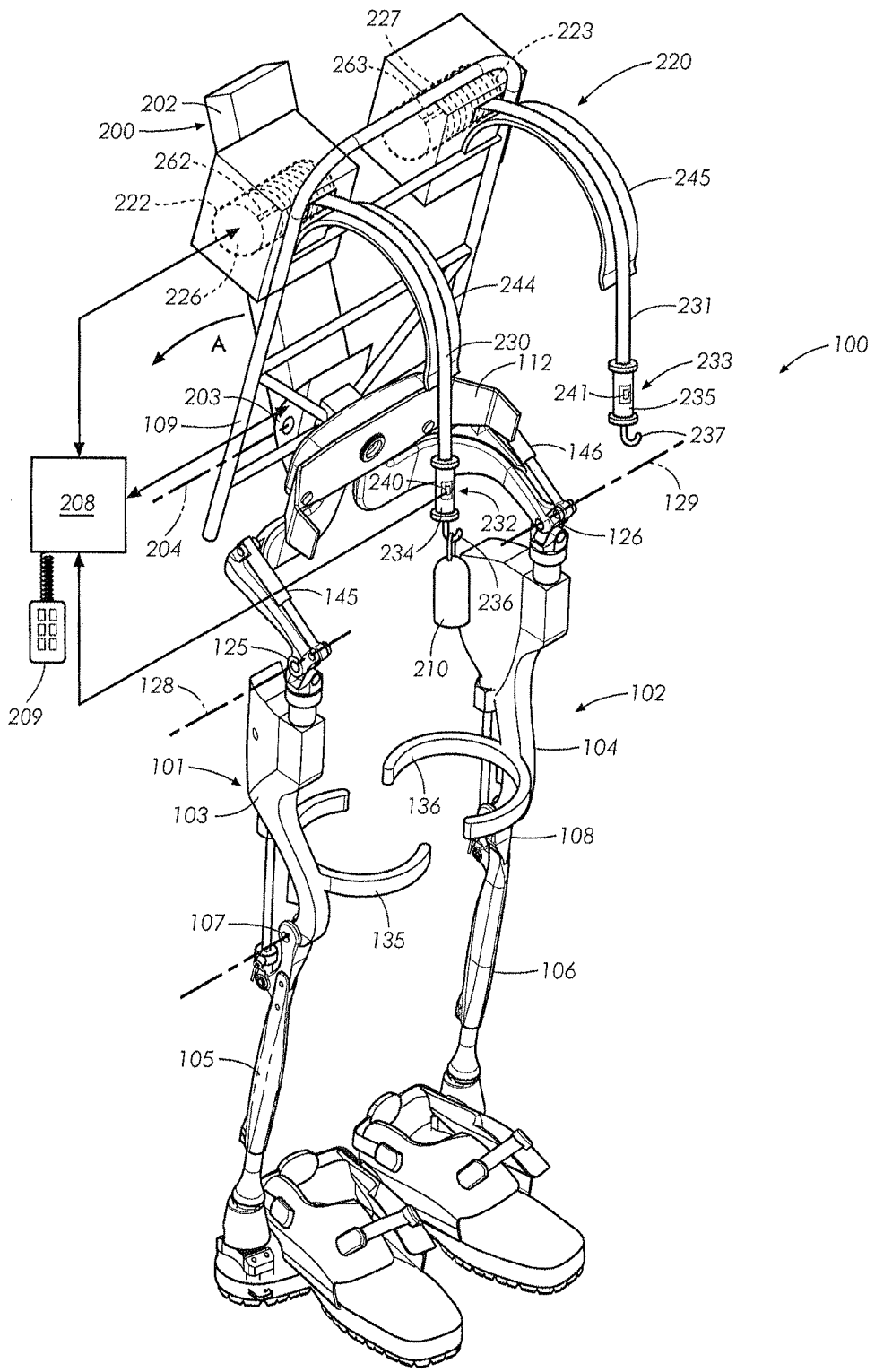

EXOSKELETON LOAD HANDLING SYSTEM AND METHOD OF USE

CROSS-REFERENCE TO RELATED APPLICATIONS

This application represents a National Stage application of PCT/US2011/031815 entitled "Exoskeleton Load Handling S stem and Method of Use" filed. Apr. 8, 2011, which claims the benefit of U.S. Provisional Application Ser. No. 61/322,645 entitled "Wearable Load Lifting System" filed Apr. 9, 2010.

BACKGROUND OF THE INVENTION

Field of the Invention

The present invention pertains to the art of material handling systems and, more particularly, to the field of lower extremity exoskeletons that are worn by a user to allow for lifting and lowering heavy loads in front of the user.

Discussion of the Prior Art

It is known in the art of exoskeletons to provide extension frames which extend from an exoskeleton trunk and are configured to hold a load in front of a person wearing the exoskeleton, as taught by U.S. Patent Application Publication No. 2007/0056592. While useful, such a configuration does not provide for easy manipulation of a load by the wearer. Additionally, such a device does not address the problem of unequal weight distribution about an exoskeleton trunk, which could cause significant balancing problems for a wearer of the exoskeleton, while the wearer is stationary as well as walking.

Powered load manipulation devices are also known to aid a person in lifting and moving heavy loads. One such device set forth in U.S. Pat. No. 6,886,812 utilizes a take-up-pulley driven by an actuator, and is attached directly to a ceiling, wall or overhead crane. Although useful for manipulating loads in an auto assembly plant, warehouse or the like, this type of device is limited to a specific geographic area and must be connected to, and supported by, an overhead structure.

Regardless of known load handling systems, there is seen to exist a need for an exoskeleton device that allows a user to manipulate and carry a front load while addressing the problem of weight distribution about the trunk of the exoskeleton.

SUMMARY OF THE INVENTION

The present invention is directed to an exoskeleton including a load handling system which is wearable by a person and allows its wearer to carry a load in front of the person. The exoskeleton includes first and second leg supports which are configured to be coupled to a person's lower limbs and rest on the ground during their stance phase. Each of the leg supports may include a knee joint connecting respective thigh links and shank links, which allow for flexion and extension of the leg supports. The exoskeleton includes an exoskeleton trunk having an upper body interface device configurable to be coupled to a person's upper body. The exoskeleton trunk is rotatably connected to the leg supports through hip joints which allow for rotation of the leg supports about hip flexion-extension axes. Optionally, the exoskeleton further includes two hip torque generators configured to create torques between the exoskeleton trunk and the leg supports.

The exoskeleton trunk is configured to allow the attachment of a load to both the back (e.g., a backpack) and the front of the exoskeleton trunk. The front load is attached to a load bearing device that extends in front of the human torso from the exoskeleton trunk. The load bearing device attaches to powered reel mechanisms that attach to end-effectors with load bearing lines. The end-effector connects to the front load and allows the powered reel mechanism to raise and lower the front load. Collectively, these devices (the reel, end-effector, lines and the load bearing device) constitute a human power amplifier. An interface may be provided to enable the user to control the human power amplifier to selectively raise or lower load bearing lines to which a load may be attached. In the preferred embodiment, the human power amplifier includes a human interaction sensor attached to a handle on the end-effector that measures the force the human exerts on the load through the end-effector. In this embodiment, the human power amplifier also includes a controller that receives the human interaction sensor measurement and controls the powered reel mechanisms. The controller controls the powered reel mechanisms to apply a force on the front load based on the measurement of the force applied by the human to the human interaction sensor. The human need only apply a force that is a reduced percentage of the overall load, and therefore the force applied by the human is effectively amplified.

A counterweight device is attached to the back side of the exoskeleton trunk. In use, an auxiliary mass of the counterweight device is shifted about a pivotal axis by a counterweight actuator in order to balance forces applied to the exoskeleton trunk by the counterweight device and a front load connected to the exoskeleton. In a preferred embodiment, a controller is in communication with one or more sensors adapted to measure a force due to the front load. In use, the controller calculates the moments created about the hip flexion-extension axes by the auxiliary mass and the moment created by the downward force on the lines by the front load, and then automatically moves the auxiliary mass to a position appropriate to approximately balance the two moments.

Additional objects, features and advantages of the present invention will become more readily apparent from the following detailed description of preferred embodiments when taken in conjunction with the attached drawing.

BRIEF DESCRIPTION OF THE DRAWINGS

FIG. 1 is a front perspective view of an exoskeleton of the present invention.

DETAILED DESCRIPTION OF THE INVENTION

With initial reference to FIG. 1, an exoskeleton 100 including a load handling system is shown as wearable by a person and allows its wearer to carry a load in front of the person. Lower extremity exoskeleton 100 includes first and second leg supports 101 and 102 which are configured to be coupled to a person's lower limbs (i.e., at least a portion of the person's legs) and rest on the ground during their stance phase. First and second leg supports 101, 102 include respective thigh links 103 and 104 and shank links 105 and 106. Although not required, particularly in situations where the invention is employed in non-anthropomorphic configurations (not shown), first and second knee joints 107 and 108 are preferably employed to connect respective thigh links 103, 104 and shank links 105, 106 and are configured to allow flexion and extension between the respective thigh links 103, 104 and shank links 105, 106 during a swing phase of a corresponding leg support 101, 102. In one embodiment, first and second knee joints 107 and 108 are configured to resist flexion between respective shank links 105, 106 and thigh links 103, 104 during a stance phase of the corresponding leg support 101, 102. Exoskeleton 100 further comprises an exoskeleton trunk 109, including an upper body interface device 112. Exoskeleton trunk 109 is configurable to be coupled to a person's upper body through upper body interface device 112. By the term "upper body", it is meant any location generally above the thighs, including the buttock. Although depicted as a simple waist belt in FIG. 1, upper body interface device 112 could include, without limitation, vests, belts, straps, shoulder straps, chest straps, a body cast, a harness and waist belts, or the like.

Exoskeleton trunk 109 is rotatably connected to first and second leg supports 101 and 102 at hip flexion-extension joints 125 and 126, allowing for hip flexion and extension rotation of leg supports 101 and 102 about hip flexion-extension axes 128 and 129, respectively. First and second leg supports 101 and 102 are configurable to be coupled to a person's lower limbs through lower limb interface elements 135 and 136. In the embodiment shown in FIG. 1, lower limb interface elements 135 and 136 are coupled to respective thigh links 103 and 104, however elements 135 and 136 may be alternatively coupled to shank links 106 and 107, or coupled to, either directly or indirectly, both thigh links 103, 104 and shank links 105, 106. Each lower limb interface element 135, 136 comprises an element or combination of elements including, without limitation, straps, bars, C-shaped brackets, a body cast, and elastomers. In operation, a person is preferably coupled to or wears exoskeleton 100 through upper body interface device 112 and by coupling to first and second leg supports 101 and 102 through lower limb interface elements 135 and 136. Optionally, exoskeleton 100 can also include two hip torque generators 145 and 146 which are configured to create torques between exoskeleton trunk 109 and first and second leg supports 101 and 102. As the parts of exoskeleton 100 discussed above are known in the art and included for the sake of completeness, they will not be further discussed herein. Instead, the present invention is particularly directed to a load handling system for use with exoskeleton 100, and a method of use thereof, as will now be described in detail.

In a preferred embodiment shown, the load handling system of the present invention includes counterweight device 200 defined by an auxiliary mass 202 rotatably attached to a counterweight actuator 203 for movement about a pivotal axis 204. Counterweight actuator 203 is in turn secured to a back portion of exoskeleton trunk 109. In use, auxiliary mass 202 can be selectively rotated about counterweight pivotal axis 204 by a drive unit, such as an electric motor (not shown) having a shaft coaxial with pivotal axis 204 to which auxiliary mass 202 is keyed or a linear actuator connected between exoskeleton trunk 109 and auxiliary mass 202, in order to shift the center of gravity of exoskeleton 100 when carrying a front load 210. In one embodiment, a user utilizes a controller 208 and associated control interface 209 in communication with counterweight actuator 203 to selectively shift auxiliary mass 202 with respect to exoskeleton trunk 109. For example, when loads in front of the operator are high, such as from load 210, auxiliary mass 202 may be selectively rotated farther aft of the user, as indicated by arrow A in FIG. 1, in order to at least partially balance the weight of load 210 about hip flexion-extension axes 128 and 129. Although not depicted, it should be understood that auxiliary mass 202 may additionally include a movable axis perpendicular to axis 204 to allow for shifting of auxiliary mass 202 from side to side. Although not preferred, auxiliary mass 202 may alternatively be manually shiftable with respect to exoskeleton trunk 109.

In a preferred embodiment, counterweight device 200 is utilized in conjunction with a load bearing device in the form of a human power amplifier 220. As depicted in FIG. 1, human power amplifier 220 includes first and second load shifting devices 222 and 223. In the preferred embodiment shown, first and second load shifting devices 222 and 223 are in the form of winches, each including a respective powered reel mechanism 226, 227 adapted to reel in or out (raise or lower) a load-bearing line 230, 231. In one embodiment, user interface 209 can be utilized to actuate respective powered reel mechanisms 226, 227 to selectively raise or lower lines 230, 231. Lines 230, 231 may be any flexible material of high tensile strength including, without limitation, wire, wire rope, webbing, and rope. Each line 230, 231 includes an end-effector 232, 233 connected thereto for attaching lines 230, 231 to a load. Although shown as a handle-type arrangement, end-effectors 232, 233 can be in any form for connecting lines 230-231 to a load. In the preferred embodiment shown, each end-effector 230 and 231 includes a handle portion 234, 235 and a simple hook 236, 237 for attaching a load, such as load 210. It should be understood that load 210 could be any type of load which is capable of being coupled to end-effectors 232, 233, and which is within the weight tolerance levels of human power amplifier 220 and exoskeleton 100. In one embodiment, each end-effector 232, 233 includes a sensor 240, 241. In one embodiment, sensors 240, 241 are human interaction sensors, which are located in respective handle portions 234 and 235 and are adapted to measure a force applied by the operator to the load 210 through the handles 234, 235 and the end-effectors 232, 233. In this embodiment, controller 208 can control powered reel mechanisms 226, 227 based on the measurement date of human force from the human interaction sensors 240, 241 so that the force applied by the operator to load 210 is effectively amplified. In the simplest embodiment, controller 208 is configured to apply a force to load 210 that is proportional to the force measured by human interaction sensors 240 and 241, but it should be clear to one skilled in the art that there are many possible implementations of this control law. First and second load shifting devices 222 and 223 also include respective guides 244 and 245 in the form of shoulder straps adapted to extend over the shoulders of a wearer. Guides 244 and 245 also function as upper body interface devices. Preferably, guides 244 and 245 are stiff load-bearing shoulder straps which prevent a load force supplied by an attached load (e.g., load 210) from bearing directly on a wearer's shoulders.

In accordance with the invention, controller or microprocessor 208 is in communication with sensors 240, 241 and/or sensing devices 262, 263, which are adapted to measure a force being applied by load shifting devices 222, 223 to lines 230, 231. For clarities sake, FIG. 1 only shows lines of communication between controller 208 and sensors 240 and 262, however, it should be understood that controller 208 is also in communication with sensors 241 and 263. Controller 208 calculates the moment created about hip flexion-extension axes 128 and 129 by auxiliary mass 202 and the moment created by the downward force on lines 230, 231 by the applied load(s), e.g., load 210, positioned in front of the user. Based on these calculations, controller 208 then automatically moves auxiliary mass 202 to a position appropriate to approximately balance the two moments. It should be understood that data from human interaction sensors 240, 241 are sufficient for calculating the moment created about hip flexion-extension axes 128 and 129 by the applied load(s), and that sensors 262 and 263 are also sufficient for calculating the moment created about hip flexion-extension axes 128 and 129. However, the sensors 240, 241, and sensors 262, 263 may also be used in combination to produce a more accurate estimate of the moment created about hip flexion-extension axes 128 and 129 by the applied load(s). At this point, it should also be realized that sensors 240, 241 could perform dual functions, i.e., act as the human interaction sensors as well as measuring forces applied by the load shifting devices.

Although described with reference to preferred embodiments of the invention, it should be readily understood that various changes and/or modifications can be made to the invention without departing from the spirit thereof. For instance, it will be noted that one skilled in the art could configure the movable auxiliary mass to be translated linearly or be swung on a linkage type mechanism rather than being rotated. That is, although shown as utilizing a pivoting auxiliary mass, any mechanism for moving the auxiliary mass fore and aft relative to the hip flexion-extension axes to produce the desired effect may be utilized. Furthermore, the mechanism may allow for moving the auxiliary mass side to side to balance unequal moments from side to side. In addition, it should also be understood that the human power amplifier of the present invention may be utilized on its own without the counterweight device. Finally, although shown to include two hip torque generators in FIG. 1, in a preferred embodiment, the exoskeleton can be structured without the hip torque generators. In particular, this embodiment may be implemented where the net moment on the exoskeleton trunk about the hip flexion-extension axes is near zero due to the use of the auxiliary mass. In such a case, the need for the hip torque generators is greatly reduced or even eliminated because the wearer of the exoskeleton can provide the small amount of remaining torque needed to the keep the exoskeleton trunk upright under loaded conditions. In general, the invention is only intended to be limited by the scope of the following claims.

We claim:

1. An exoskeleton including a load handling system configured to be coupled to a person, said exoskeleton comprising:
   first and second leg supports configured to be coupled to the person's lower limbs and rest on a support surface during a stance phase;
   an exoskeleton trunk configured to be coupled to the person's upper body, said exoskeleton trunk being interconnected to each of the first and second leg supports at respective hip joints to allow for flexion and extension between the first and second leg supports and the exoskeleton trunk about respective hip axes;
   a human power amplifier including:
      a first load shifting device including a first powered reel mechanism connected to a first line;
      a first end-effector located on the first line and configured to connect to a load;
      a first guide supporting the first end-effector in a position in front of the exoskeleton trunk; and
      a load shifting actuator for selectively operating the first powered reel mechanism to selectively raise or lower the first line with respect to the exoskeleton trunk; and
   a counterweight device including an auxiliary mass connected to the exoskeleton trunk through an actuator such that the auxiliary mass extends in a position behind the exoskeleton trunk, wherein said actuator is selectively actuated to shift a center of gravity of the auxiliary mass with respect to the exoskeleton trunk.

2. The exoskeleton of claim 1, further comprising:
   at least one hip torque generator configured to create torque between said exoskeleton trunk and one of the first and second leg supports.

3. The exoskeleton of claim 1, wherein the human power amplifier further comprises:
   a first handle on the first end-effector configured to be grasped by the person;
   a first human interaction sensor configured to sense a force applied by the person to the first handle; and
   a controller that acts to apply a force on the load through the first powered reel mechanism based at least in part on the force sensed by the first human interaction sensor.

4. The exoskeleton of claim 1, wherein the human power amplifier further comprises:
   a first load sensor configured to sense a force applied by a load supported by the first end-effector; and
   a controller in communication with the first load sensor and the actuator, wherein the controller operates the actuator to shift the center of gravity of the auxiliary mass based at least in part on the force sensed by the first load sensor.

5. The exoskeleton of claim 4, wherein the first load sensor is located in the first end-effector.

6. The exoskeleton of claim 4, wherein the first load sensor is located in the first load shifting device.

7. The exoskeleton of claim 4, wherein the controller operates the actuator to shift the center of gravity of the auxiliary mass to a position to balance the exoskeleton due to the load.

8. The exoskeleton of claim 1, wherein the first guide is in the form of a load-bearing shoulder strap configured to extend over a shoulder of a wearer of the exoskeleton.

9. The exoskeleton of claim 1, wherein the human power amplifier further comprises:
   a second load shifting device including a second powered reel mechanism connected to a second line;
   a second end-effector located on the second line and configured to connect to a load;
   a second guide supporting the second end-effector in a position in front of the exoskeleton trunk; and
   wherein the load shifting actuator selectively operates the first and second powered reel mechanism to selectively raise or lower the first and second lines with respect to the exoskeleton trunk.

10. The exoskeleton of claim 9, wherein the human power amplifier further comprises:
    a first handle on the first end-effector configured to be grasped by the person;
    a second handle on the first end-effector configured to be grasped by the person;
    a first human interaction sensor configured to sense a force applied by the person to the first handle;
    a second human interaction sensor configured to sense a force applied by the person to the second handle; and
    a controller that acts to apply a force on the load through the second powered reel mechanism based at least in part on forces sensed by the first and second human interaction sensors.

11. The exoskeleton of claim 9, wherein the human power amplifier further comprises:

a first load sensor configured to sense a force applied by a load supported by the first end-effector;

a second load sensor configured to sense a force applied by a load supported by the second end-effector; and a controller in communication with the first and second load sensors and the actuator, wherein the controller operates the actuator to shift the center of gravity of the auxiliary mass based at least in part on forces sensed by the first and second load sensors.

12. The exoskeleton of claim 11, wherein the second load sensor is located in the second end-effector.

13. The exoskeleton of claim 11, wherein the second load sensor is located in the second load shifting device.

14. The exoskeleton of claim 11, wherein the controller operates the actuator to shift the center of gravity of the auxiliary mass to a position to balance the exoskeleton.

15. The exoskeleton of claim 9, wherein the second guide is in the form of a load-bearing shoulder strap configured to extend over a shoulder of a wearer of the exoskeleton.

16. An exoskeleton including a load handling system and configured to be coupled to a person, said exoskeleton comprising:

first and second leg supports configured to be coupled to the person's lower limbs and rest on a support surface during a stance phase;

an exoskeleton trunk configured to be coupled to the person's upper body, said exoskeleton trunk being interconnected to each of the first and second leg supports at respective hip joints to allow for flexion and extension between the first and second leg supports and the exoskeleton trunk about respective hip axes;

a load bearing device attached to said exoskeleton trunk and configured to support a load in front of a wearer of the exoskeleton; and a counterweight device including an auxiliary mass connected to the exoskeleton trunk through an actuator such that the auxiliary mass extends in a position behind the exoskeleton trunk, wherein said actuator is selectively actuated to shift a center of gravity of the auxiliary mass with respect to the exoskeleton trunk.

17. The exoskeleton of claim 16, further comprising:

at least one hip torque generator configured to create torque between said exoskeleton trunk and one of the first and second leg supports.

18. The exoskeleton of claim 16, wherein the load bearing device includes a load-bearing shoulder strap configured to extend over a shoulder of a wearer of the exoskeleton.

19. The exoskeleton of claim 16, wherein the load bearing device includes at least one sensor adapted to sense a force applied by a load on the load bearing device, and the exoskeleton further comprises:

a controller in communication with the at least one sensor and the actuator, wherein the controller operates the actuator to shift the center of gravity of the auxiliary mass based at least in part on the force sensed by the at least one sensor.

20. The exoskeleton of claim 16, further comprising:

a controller in communication with the actuator of the auxiliary mass, wherein the controller is configured to operate the actuator of the auxiliary mass to shift the center of gravity of the auxiliary mass with respect to the exoskeleton trunk.

21. An exoskeleton including a load handling system configured to be coupled to a person, said exoskeleton comprising:

first and second leg supports configurable to be coupled to the person's lower limbs and rest on a support surface during a stance phase;

an exoskeleton trunk configurable to be coupled to the person's upper body and to each of the first and second leg supports at respective hip joints to allow for flexion and extension between the first and second leg supports and the exoskeleton trunk about respective hip axes; and a human power amplifier including:

a first load shifting device including a first powered reel mechanism connected to a first line;

a first end-effector located on the first line and configured to connect to a load;

a first guide supporting the first end-effector in a position in front of the exoskeleton trunk; and a load shifting actuator for electrically actuating the first powered reel mechanism to selectively raise or lower the first line with respect to the exoskeleton trunk.

22. The exoskeleton of claim 21, further comprising:

at least one hip torque generator configured to create torque between said exoskeleton trunk and one of the first and second leg supports.

23. The exoskeleton of claim 21, wherein the human power amplifier further comprises:

a first handle on the first end-effector configured to be grasped by the person; and a first human interaction sensor configured to sense a force applied by the person to the first handle;

wherein the load shifting actuator includes a controller that acts to apply a force on the load through the first powered reel mechanism based at least in part on the force sensed by the first human interaction sensor.

24. The exoskeleton of claim 23, wherein the human power amplifier further comprises:

a second handle on the first end-effector configured to be grasped by the person; and a second human interaction sensor configured to sense a force applied by the person to the first handle;

wherein the controller that acts to apply a force on the load through at least the first powered reel mechanism by the first and second human interaction sensors.

25. The exoskeleton of claim 21, wherein the first guide is in the form of a load-bearing shoulder strap.

26. The exoskeleton of claim 21, wherein the human power amplifier further comprises:

a second load shifting device including a second powered reel mechanism connected to a second line;

a second end-effector located on the second line and configured to connect to a load;

a second guide supporting the second end-effector in a position in front of the exoskeleton trunk; and wherein the load shifting actuator electrically actuates the first and second powered reel mechanisms to selectively raise or lower the first and second lines with respect to the exoskeleton trunk.

27. The exoskeleton of claim 26, wherein the second guide is in the form of a load-bearing shoulder strap configured to extend over a shoulder of a wearer of the exoskeleton.

28. A method for balancing a front load on an exoskeleton including first and second leg supports configured to be coupled to a person's lower limbs and rest on a support surface during a stance phase, an exoskeleton trunk configurable to be coupled to the person's upper body and to each of the first and second leg supports at respective hip joints to allow for flexion and extension between the first and second leg supports and the exoskeleton trunk about respective hip axes, the method comprising:

attaching a front load to the exoskeleton trunk such that the front load extends in front the exoskeleton trunk; and shifting a position of an auxiliary mass located behind the exoskeleton trunk to shift a center of gravity of the auxiliary mass with respect to the exoskeleton trunk.

29. The method of claim 28, wherein the front load is attached to a load bearing device including a sensor, and the exoskeleton further including a controller in communication with the load bearing device and an actuator for the auxiliary mass, the method further comprising:

sensing, via the sensor, a force applied by the front load on the load bearing device; and wherein the step of shifting the position of the auxiliary mass with respect to the exoskeleton trunk comprises shifting the auxiliary mass to a position appropriate to approximately counterbalance the front load.

30. The method of claim 29, further comprising:

calculating, via the controller, a first moment created about the hip axes by the auxiliary mass and a second moment created by a downward force of the front load on the load bearing device, wherein the calculation is used to determine the position appropriate to approximately counterbalance the front load by balancing the first and second moments.

31. A method of shifting a load relative to an exoskeleton including first and second leg supports configured to be coupled to a person's lower limbs and rest on a support surface during a stance phase, an exoskeleton trunk configurable to be coupled to the person's upper body and to each of the first and second leg supports at respective hip joints to allow for flexion and extension between the first and second leg supports and the exoskeleton trunk about respective hip axes, the method comprising:

connecting a first load to a first end-effector located on a first line attached to a first powered reel mechanism of a first load shifting device extending from said exoskeleton; and electrically actuating the first powered reel mechanism to selectively raise or lower the first line with respect to the exoskeleton trunk.

32. The method of claim 31, wherein the exoskeleton further includes a handle connected to the first end-effector and a human interaction sensor adapted to measure a force imparted on the handle, the method further comprising:

controlling the first powered reel mechanism to apply a force to the first load based at least in part on measurement data from the human interaction sensor.

33. The method of claim 31, further comprising:

connecting a second load to a second end-effector located on a second line attached to a second powered reel mechanism of a second load shifting device extending from said exoskeleton; and actuating the second powered reel mechanism to selectively raise or lower the second line with respect to the exoskeleton trunk.

34. The method of claim 33, wherein the exoskeleton further includes first and second handles connected to the first and second end-effectors respectively, each of the first and second handles including a human interaction sensor adapted to measure a force imparted on the respective handle, the method further comprising:

controlling the first and second powered reel mechanisms to apply forces on the first and second loads based at least in part on measurement data from the first and second human interaction sensors.

* * * * *